(12) United States Patent
Wang et al.

(10) Patent No.: US 9,369,844 B2
(45) Date of Patent: *Jun. 14, 2016

(54) SYSTEM AND METHOD FOR PROVIDING LOCALLY APPLICABLE INTERNET CONTENT WITH SECURE ACTION REQUESTS AND ITEM CONDITION ALERTS

(71) Applicants: Tiehong Wang, Arlington, VA (US); Ximing Wang, Beijing (CN); Tiejun Wang, La Jolla, CA (US)

(72) Inventors: Tiehong Wang, Arlington, VA (US); Ximing Wang, Beijing (CN); Tiejun Wang, La Jolla, CA (US)

(73) Assignee: Virginia Innovation Sciences, Inc., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/475,026

(22) Filed: Sep. 2, 2014

(65) Prior Publication Data

US 2015/0072711 A1 Mar. 12, 2015

Related U.S. Application Data

(60) Continuation of application No. 13/236,139, filed on Sep. 19, 2011, now Pat. No. 8,849,201, which is a continuation of application No. 13/137,842, filed on Sep. 16, 2011, now Pat. No. 8,095,154, which is a
(Continued)

(51) Int. Cl.
*H04W 4/02* (2009.01)
*G06Q 10/08* (2012.01)
(Continued)

(52) U.S. Cl.
CPC ............. *H04W 4/023* (2013.01); *G06Q 10/087* (2013.01); *G06Q 30/02* (2013.01); *G06Q 30/0225* (2013.01); *G06Q 30/0261* (2013.01); *G06Q 30/06* (2013.01); *H04L 29/06027* (2013.01); *H04L 63/0492* (2013.01); *H04L 65/4084* (2013.01); *H04L 65/80* (2013.01); *H04L 67/04* (2013.01); *H04L 67/18* (2013.01); *H04L 67/2819* (2013.01); *H04L 67/2842* (2013.01); *H04L 67/322* (2013.01);
(Continued)

(58) Field of Classification Search
CPC ...... H04W 4/023; H04W 24/08; H04L 67/18; H04L 67/322; H04L 67/04; H04L 67/2842; H04L 67/2819; H04L 65/80; H04L 65/4084; H04L 63/0492; G06Q 30/0261; G06Q 30/02; H04N 21/4784; H04N 21/41407
See application file for complete search history.

(56) References Cited

U.S. PATENT DOCUMENTS 6,084,522 A 7/2000 Addy
6,108,703 A 8/2000 Leighton
(Continued)

FOREIGN PATENT DOCUMENTS

KR 100678772 B1 7/2000
KR 20000037185 A 7/2000
(Continued)

*Primary Examiner* — Chuong A Ngo

(57) ABSTRACT

Optimized delivery of locally applicable Internet content to users. A cache of locally applicable Internet content is maintained in a local content server, based upon a monitoring of locations of users requesting Internet content. Requests for Internet content are received from user equipment through a wireless network base station, and served from the local content server, which is logically proximate to the wireless network base station. The caching of locally applicable Internet content may be maintained on a layered basis. Secure action request receipt and corresponding performance, and item condition alerts are also described.

60 Claims, 8 Drawing Sheets

Related U.S. Application Data continuation of application No. 13/064,077, filed on Mar. 4, 2011, now Pat. No. 8,023,968, which is a division of application No. 12/577,230, filed on Oct. 12, 2009, now Pat. No. 8,073,468, which is a continuation of application No. 11/501,747, filed on Aug. 10, 2006, now Pat. No. 7,603,131.

(60) Provisional application No. 60/787,510, filed on Mar. 31, 2006, provisional application No. 60/707,561, filed on Aug. 12, 2005.

(51) Int. Cl.
| | | |
|---|---|---|
| *G06Q 30/02* | (2012.01) | |
| *G06Q 30/06* | (2012.01) | |
| *H04L 29/06* | (2006.01) | |
| *H04N 21/222* | (2011.01) | |
| *H04N 21/2343* | (2011.01) | |
| *H04N 21/414* | (2011.01) | |
| *H04N 21/4784* | (2011.01) | |
| *H04N 21/81* | (2011.01) | |
| *H04L 29/08* | (2006.01) | |
| *H04W 24/08* | (2009.01) | |
| *H04W 12/06* | (2009.01) | |

(52) U.S. Cl.
CPC .... *H04N 21/222* (2013.01); *H04N 21/234327* (2013.01); *H04N 21/41407* (2013.01); *H04N 21/4784* (2013.01); *H04N 21/812* (2013.01); *H04W 4/02* (2013.01); *H04W 24/08* (2013.01); *H04L 67/289* (2013.01); *H04W 12/06* (2013.01); *Y10S 707/99935* (2013.01)

(56) References Cited

U.S. PATENT DOCUMENTS

| | | | |
|---|---|---|---|
| 6,286,049 B1 * | 9/2001 | Rajakarunanayake | H04Q 11/0478 709/227 |
| 6,892,052 B2 | 5/2005 | Kotola | |
| 7,010,578 B1 | 3/2006 | Lewin | |
| 7,133,905 B2 | 11/2006 | Dilley | |
| 7,225,254 B1 | 5/2007 | Swildens et al. | |
| 7,395,355 B2 | 7/2008 | Afergan | |
| 7,502,858 B2 | 3/2009 | Gupta | |
| 7,519,363 B2 | 4/2009 | Shin | |
| 7,693,522 B2 | 4/2010 | Bichot | |
| 2002/0075382 A1 | 6/2002 | Cohen | |
| 2002/0116265 A1 | 8/2002 | Hernandez | |
| 2002/0144121 A1 | 10/2002 | Ellison | |
| 2002/0167587 A1 | 11/2002 | Ogasawara | |
| 2002/0180600 A1 | 12/2002 | Kirkland | |
| 2003/0153351 A1 | 8/2003 | Jung | |
| 2003/0191812 A1 | 10/2003 | Agarwalla et al. | |
| 2003/0216969 A1 | 11/2003 | Bauer et al. | |
| 2003/0226143 A1 | 12/2003 | Michael | |
| 2004/0023666 A1 | 2/2004 | Moon | |
| 2005/0021586 A1 | 1/2005 | Bichot | |
| 2005/0086164 A1 | 4/2005 | Kim | |
| 2005/0114891 A1 | 5/2005 | Wasenius | |
| 2006/0013170 A1 | 1/2006 | Shin | |
| 2006/0047835 A1 | 3/2006 | Greaux | |
| 2006/0204051 A1 | 9/2006 | Holland | |
| 2006/0253392 A1 | 11/2006 | Davies | |
| 2006/0293065 A1 * | 12/2006 | Chew | G06Q 30/02 455/456.3 |
| 2007/0052517 A1 | 3/2007 | Bishop | |
| 2009/0103509 A1 | 4/2009 | Sanderford | |
| 2013/0185202 A1 | 7/2013 | Goldthwaite | |
| 2013/0226721 A1 | 8/2013 | Chmara | |

FOREIGN PATENT DOCUMENTS

| | | |
|---|---|---|
| KR | 100444213 B1 | 1/2002 |
| KR | 20020005995 A | 1/2002 |
| KR | 100724210 B1 | 6/2002 |
| KR | 20020047701 A | 6/2002 |
| KR | 20020051552 A | 6/2002 |
| KR | 20020056854 A | 7/2002 |
| KR | 100493805 B1 | 9/2003 |
| KR | 20030075851 A | 9/2003 |
| KR | 20040037289 A | 5/2004 |
| KR | 20040054449 A | 6/2004 |
| KR | 20040059103 A | 7/2004 |

* cited by examiner

SYSTEM AND METHOD FOR PROVIDING LOCALLY APPLICABLE INTERNET CONTENT WITH SECURE ACTION REQUESTS AND ITEM CONDITION ALERTS

CROSS REFERENCE TO RELATED APPLICATIONS

This application is a continuation application of Ser. No. 13/236,139 filed on Sep. 19, 2011, which is a continuation of Ser. No. 13/137,842 filed on Sep. 16, 2011, which is a continuation of Ser. No. 13/064,077 filed on Mar. 4, 2011, which is a continuation of Ser. No. 12/577,230, filed on Oct. 12, 2009, which is a continuation application of application Ser. No. 11/501,747, entitled "SYSTEM AND METHOD FOR PROVIDING LOCALLY APPLICABLE INTERNET CONTENT WITH SECURE ACTION REQUESTS AND ITEM CONDITION ALERTS", filed on Aug. 10, 2006, now U.S. Pat. No. 7,603,131, issued on Oct. 13, 2009, which claims the benefit under 35 U.S.C. §119 of previously filed provisional patent application Ser. No. 60/787,510, entitled "An Intelligent Kiosk for Mobile Payment" and filed on Mar. 31, 2006, and which claims the benefit under 35 U.S.C. §119 of previously filed provisional patent application Ser. No. 60/707,561, entitled "A Novel Structure of Cellular System for Internet Access" and filed on Aug. 12, 2005. The entire contents of these applications are hereby incorporated by reference.

BACKGROUND OF THE INVENTION

1. Field of the Invention

This invention relates generally to accessing content through a network and more particularly to localized content delivery that implements multiple networks.

2. Description of the Related Art

Empowered by the next generation of wireless technology, cellular networks can provide users with access to information from the Internet such as video on demand, video conferences, databases, etc. The use of cellular phones is thus no longer limited to voice transmission.

However, there are still some problems with the delivery of Internet content through cellular phones. For example, even with the high bandwidth connection provided by advanced cellular systems, there remains a bottleneck between the Internet and the cellular network (CN), as well as delays caused by the Internet itself. This condition hinders the ability of cellular phone users to fully exploit the capabilities of the advanced CN. Since smooth and effective data flow is important to users, this bottleneck hinders the adoption of cellular phones for Internet access.

Making payment requests is another area of need. Although more and more individuals have become accustomed to purchasing goods and services online, there is not a streamlined and consistent mechanism for securely making requests for such payments.

Still another area of need relates to alerts. Locations including homes, offices, and other environments typically include computing devices as well as at least some form of network connection. Despite all of this connectivity, there are certain conditions for which adequate alerts remain unavailable. For example, billions of children wear diapers, and probably a quarter of them may suffer the effects of wet diapers at any given moment, since caretakers (e.g., parents, baby sitters, etc.) are not apprised of the status of their diapers in real time.

Thus, there remains a need for systems and corresponding devices and processes that avoid the shortcomings of existing networks for delivering Internet content using the CN. There also remains a need for systems and corresponding techniques for making payment requests. There also remains a need for systems and corresponding techniques for delivering alerts to individuals such as caregivers tasked with managing a child in diapers.

SUMMARY OF THE INVENTION

The present invention provides systems, apparatus and methods for efficient delivery of Internet content in communications involving a CN and corresponding cellular device.

According to one aspect, the present invention accommodates the optimized delivery of locally applicable Internet content to users. This aspect may, for example, be practiced in a system wherein a user equipment access Internet content through a wireless network. The locations for users respectively requesting Internet content are determined based upon an identification of wireless network base stations through which the requests for the Internet content are made. The Internet content requested by users from a particular location corresponding to a given wireless network base station can thus be monitored.

A cache of locally applicable content caches particular Internet content that is determined to be locally applicable based upon the monitoring of the Internet content accessed by users from the particular location. The particular Internet content is preferably cached at a local content server that is logically proximate to the given wireless network base station for the particular location. Logical proximity may be variously carried out, such as through physical proximity or by provision of dedicated bandwidth and resources.

Requests for Internet content for the particular location may thus be served from the cache, to optimize delivery, where the cache contents the requested content.

The caching of locally applicable Internet content may be maintained on a layered basis, such that a first layer of local applicability corresponds to Internet content requested by users in a first geographical area in which the particular location resides, and at least one succeeding layer of local applicability corresponds to Internet content requested by users in at least one succeeding geographical area that encompasses and is larger than the first geographical area.

Merchants or other commercial entities may also be provided some form of access to information related to the locally applicable Internet content, with commercial incentives such as coupons or advertisements being delivered to users based upon that information.

According to another aspect, the present invention facilitates secure receipt and performance of action requests such as payment requests. A wireless HUB receives and recognizes a unique identifier corresponding to a user equipment through a short range wireless connection. This identifier may, for example, be based upon Near Field Communication or Radio Frequency ID technology.

Once this recognition is made, the wireless HUB establishes a secure communication channel with the user equipment based upon the recognition of the unique identifier. The secure communication channel is separate from the short range wireless connection used to receive the unique identifier, and preferably provides greater bandwidth and range to accommodate additional, more detailed communications related to the action request. The action request is received from the user equipment through this secure communication channel, and information related to the action request is communicated to an external server. The action request is completed, and a confirmation of this is communicated to the user equipment.

According to still another aspect, the present invention accommodates the delivery of diaper status updates through a wireless connection. A sensor detects the condition of the diaper and accommodates a status indication when the current indication requires an updated. By way of example, the condition monitored may be wetness, with a certain level of wetness as determined by a property such as pH triggering the communication of the status indication. The status information is preferably transmitted using a wireless connection to a device that delivers a corresponding alert to at least one caregiver.

A number of designated alert recipients may also be maintained and organized. Where multiple diapers are being monitored, an identifier is associated with the status information, and the identifier is correlated to a particular designated recipient so that the alert can be appropriately directed.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

According to one aspect of the present invention, Internet content is requested and accessed by cellular users in correlation with their determined location. Provision of Internet content is customized according to location, and provided in a series of locally customized networks. A given local network includes servers configured to include content believed appropriate for its location. The delivery of content is made from a particular local network configured as such, to a user's cellular phone through the local base station.

For example, information about Hollywood may be accessed through cellular network base station(s) in the Hollywood area, when the cellular user is detected as being proximate to the Hollywood area. These base stations deliver Internet content that is relevant to the area, such as web sites about film and movie stars. This Internet content is stored in servers that the base stations covering the area can access conveniently to provide faster and more efficient transmission to the cellular users in the service area.

By optimizing the location of the Internet content for the wireless network users, this invention enables an optimum data flow for cellular users to access rich information and data of all kinds from the Internet.

Figure 1:
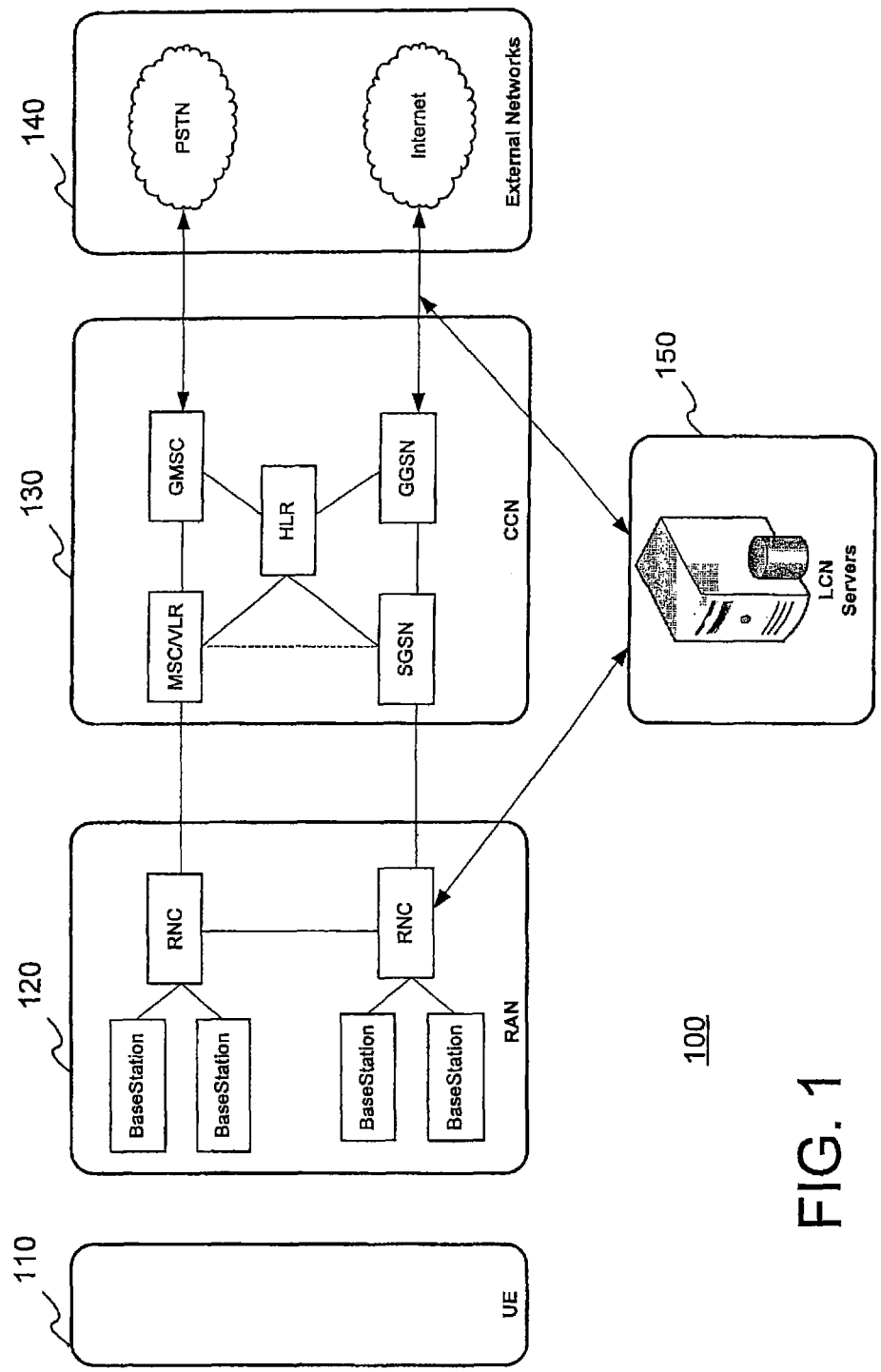
FIG. 1 is a block diagram illustrating a system in which optimized delivery of Internet content to users is provided in accordance with the present invention.

FIG. 1 is a block diagram illustrating a system 100 configured to provide Internet content delivery in accordance with the present invention. The basic elements of the system 100 are the User Equipment (UE) 110, the Radio Access Network (RAN) 120, the Core Cellular Network (CCN) 130, the External Network (EN) 140, and the Local Customized Network (LCN) 150.

The UE 110 is a cellular phone configured to communicate with base station(s) of the RAN 120. Although the UE 110 is preferably a cellular phone, it should be understood that a variety of devices may be equipped with same communication functionality. Other examples of the UE 110 include a Personal Digital Assistant (PDA), Set Top Box, Kiosk, or any personal computing device configured to include the wireless communication capability.

The RAN 120 and CCN 130 preferably implement conventional elements of a cellular network and are described further as follows. The RAN 120 includes Base Station and Radio Network Controller (RNC) elements. The Base Station provides resource management and provides an interface that converts the data flow between the UE 110 and RNC. The RNC controls radio resources for the Base Stations to which it is connected, and also manages connections to the UE 110.

The CCN 130 is connected with the EN 140. The most notable examples of the EN 140 can be grouped into two kinds: Circuit Switched (CS) 142 networks and Packet Switched (PS) 144 networks. The CS 142 network provides circuit-switched connections for circuit-switched services, such as telephony and ISDN. The PS 144 network provides connections for package data services. The Internet is a significant and notable application of a PS network.

The CCN 130 comprises MSC/VLR, GMSC, HLR, SGSN and GGSN elements. The HLR (Home Location Register) is a database that stores information such as user service profiles. The service profile includes information including allowed services, roaming areas, forwarding numbers and the like. The HLR stores the UE 110 location to accommodate that routing of calls and other information to the UE 110.

The MSC/VLR (Mobile Services Switching Center and Visitor Location Register) respectively provide switch operations and a database for the UE in its current location for Circuit Switch (CS) services. The VLR stores the user's service profile, as well as more precise information on the UE's location within the serving system. CS connections go through the GMSC (Gateway MSC), which is the switch at the point of connection to the external CS network.

The SGSN (Serving GPRS (General Packet Radio Service) Support Node) functionality is similar to that of MSC/VLR but is typically used for Packet Switch (PS) service. PS connections go through the GGSN (Gateway GPRS Support Node).

The LCN 150 comprises one or more computing devices configured to include memory, processing capability, and interfaces to provide the functionality described herein. The LCN 150 includes local servers that are configured to provide custom Internet content. The LCN 150 is also configured to include a content access monitoring module, which monitors Internet access and determines content applicable to the designated location of the LCN 150.

The LCN 150 thus performs monitoring and caching related to locally applicable content. With regard to the monitoring functionality, the monitoring includes local access, which determines which content users in the location are accessing. With regard to the caching functionality, the LCN 150 maintains a cache of locally applicable Internet content, which includes refreshing to add new content and remove stale content as determined by information received from the monitoring functionality.

One technique for determining whether content is locally applicable is measuring access frequency. If many users in the location are determined to be accessing particular Internet content, then that particular Internet content is determined to be locally applicable and is included in the cache during the next update.

In addition to monitoring and caching locally applicable content, the LCN 150 is configured to be logically proximate to the base station(s) of the cellular network at the particular location. In one example, logical proximity is carried out by having the LCN 150 physically proximate to the relevant base station(s), such as in the same geographical area. For example, the LCN 150 may be located in a metropolitan area or within an area the covers certain zip code(s) of a metropolitan area. Logical proximity may alternatively be carried out without requiring physical proximity. This, for example, may be done by providing dedicated resources including a high bandwidth connection between the LCN 150 and the local users. In this example, the LCN 150 is configured to deliver locally applicable content more efficiently and rapidly because of the dedicated resources, without necessarily requiring physical proximity.

According to another aspect, to further increase efficiency, the locally applicable content for a given LCN is organized in a layered architecture. A "first layer" of content is considered to be the content that has the highest local applicability. Additional layers are also provided upon the first layer, with succeeding layers progressively covering larger geographical areas (i.e., progressively larger numbers of base stations). According to one aspect, the layering involves communication with neighboring LCNs covering increasing areas, to determine the content that is locally applicable for the additional levels. Thus, for example, a first layer corresponds to locally applicable content at a first level of granularity (e.g., as monitored/determined only for the location of the LCN or a small local group of LCNs), a second layer corresponds to locally applicable content at a second level of granularity (e.g., the logical "AND" or intersection of content that is frequently accessed across a larger area as determined by the monitoring of access for several LCNs in the defined larger area, and so on.

Figure 2:
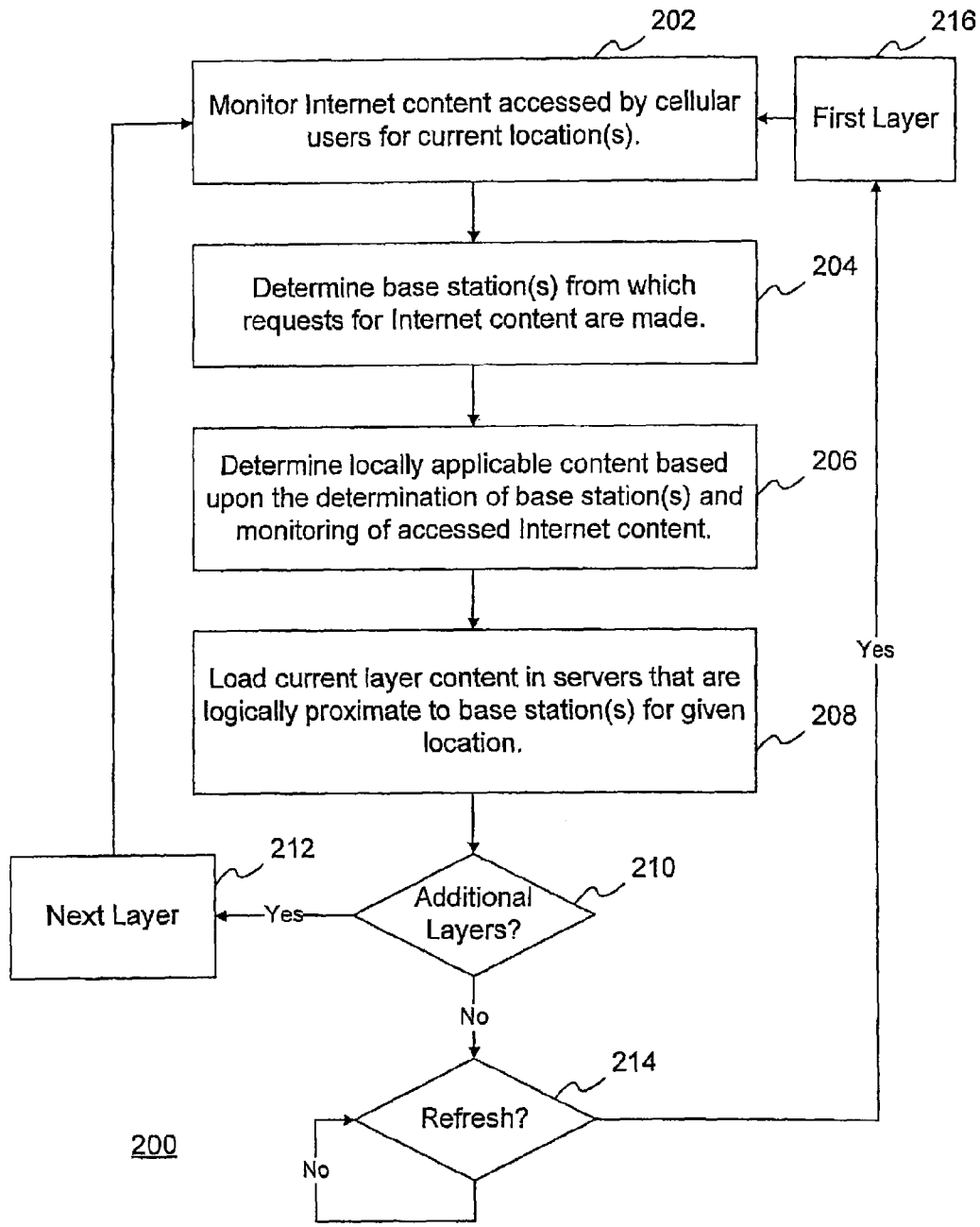
FIG. 2 is a flow diagram illustrating an embodiment of a process for determining locally applicable content for optimized content delivery in accordance with the present invention.

The operation of the system to update the LCN accordingly is described as follows, with concurrent reference to FIG. 1 and the flow diagram of FIG. 2. The process commences by monitoring 202 Internet content accessed by users for a current location. This is done by monitoring the gateway of the connection between the CCN 140 and PS 144 networks to track the Internet content accessed by the cellular users.

It is noted that the monitored content may have two useful purposes. One is to accommodate the delivery of locally applicable content, which may be determined by frequency of access for the given location. Another is to allow the providers of content (e.g., merchants or other commercial entities) to receive an indication which content is locally applicable. This allows the providers of content to assist or participate further in determining what is locally applicable. For example, a merchant provided with an indication of local applicability for certain content may wish to make advertisements, coupons, or the like available to the users in that domain.

In conjunction with this monitoring 202, determination(s) 204 of the base station(s) from which requests for the Internet content are made. This may be performed by checking the VLR and HLR to discover the base stations from which the requests for the Internet content are sent from through. It is noted that base station discovery is just one way that physical location may be determined. Other examples include but are not limited to using GPS, zip code, telephone number, and IP address information to make the determinations.

The next step comprises determining 206 locally applicable content based upon the monitoring 202 and determination(s) 204 of the base station(s). Determination of local applicability is performed by determining access frequency. Alternatively, local applicability may be determined by comparing the location of the requesting user (base station) to a location that is identified in association with the requested content.

Then, for the current (e.g., first) layer, the content is loaded 208 in servers that are logically proximate to users for the given location. This may be done by placing the current (e.g., first) layer server(s) loaded with the Internet content and/or other information/data to achieve an optimum and faster data transmission for the cellular users to access the data stored in the servers through the base stations. For example, the servers can be placed logically close to the base station through which the cellular users access the data stored in the server(s).

The process iterates through as many layers as desired. If it is determined 210 that additional layers are to be updated, then steps 202-208 are performed to load the next 212 (e.g., second) layer server(s) with locally applicable content. As described, this preferably entails a broader geographical area as the layers increase. The process continues until it is determined 210 that no more layers need to be determined and loaded. The number of layers in a given system will vary according to application, and as desired. Layering will typically involve a trade-off between maximizing locally available content and the processing resources required to generate and manage layers for progressively broader areas.

The content that is loaded into the base station(s) may be refreshed 214 on any desired schedule or trigger. For a refresh operation, the process described above repeats, starting again with the first layer. Content that is stale or otherwise determined to no longer be locally applicable may be removed, and of course new content may be added during a refresh cycle.

Additional servers may be added vertically and/or horizontally as desired. Vertically means that servers may be added at a given physical location to cover first, second, third, etc. layers. Horizontally refers to adding different sets of servers corresponding to different locations (i.e., one set for the first layer, a second set for the second layer, and so on).

A regular schedule or certain amount of activity can be used to trigger a refresh of the layering. The Internet content in the LCN 150 servers is modified according to the updated findings on the requests for the Internet content sent from the base stations. The Internet content stored in the servers is refreshed at a proper time, such as when the servers are not overwhelmed by the users accessing the contents.

The servers are thus loaded with the information for broadcast and/or multicast and/or any data to be accessed by the cellular users for an optimum transmission to the users in service areas.

The locally applicable content may be sent and delivered upon request to the users. Examples of communication pathways for sending the locally applicable Internet content include the relatively direct pathway through the RAN 120, the pathway through the CCN 130 and then the RAN 120, or others.

A variety of techniques may be used to implement the locally applicable content cached by the LCN 150 in conjunction with requests for Internet content by UE 110 (or other device) users. In one example, the UE 110 request for Internet content prompts an initial check for content in the locally applicable content, followed by conventional Internet access should the content prove to be absent from the locally applicable content that is currently cached. Additionally, based upon the layered approach described above, the first attempt to satisfy the request may be made from the first layer, followed by the second layer, and so on. The number of layers searched to respond to a particular request may vary as desired. When the number of layers designated to be searched for the current request is exhausted, conventional Internet access is used to retrieve content related to the request.

Various cache management and network optimization techniques may be used to manage the locally applicable content. For example, fully associative (FA), direct mapped (DM), and set associative (SA) mechanisms are examples of techniques that can be used to determine where a specific content can be stored on the server. Additionally, techniques to ensure block validity and to manage cache hits and misses can also be used. Random, LRU (Least Recently Used) and FIFO (First In First Out) block replacement schemes are among those that can be used to manage the blocks in the cache.

According to another aspect, the present invention facilitates a systematical solution for mobile payment (or the communication of other information, as well as the receipt of information such as alerts). Preferably, this aspect of the present invention implements a cellular network, a wireless personal area network (WPAN) and wireless identification technology. Various technologies may be used for these components, including but not limited to 3G technology for the cellular network; Zigbee, Bluetooth, or UWB technologies for the WPAN; and RFID (e.g., NFC) for the wireless identification technology.

Figure 3:
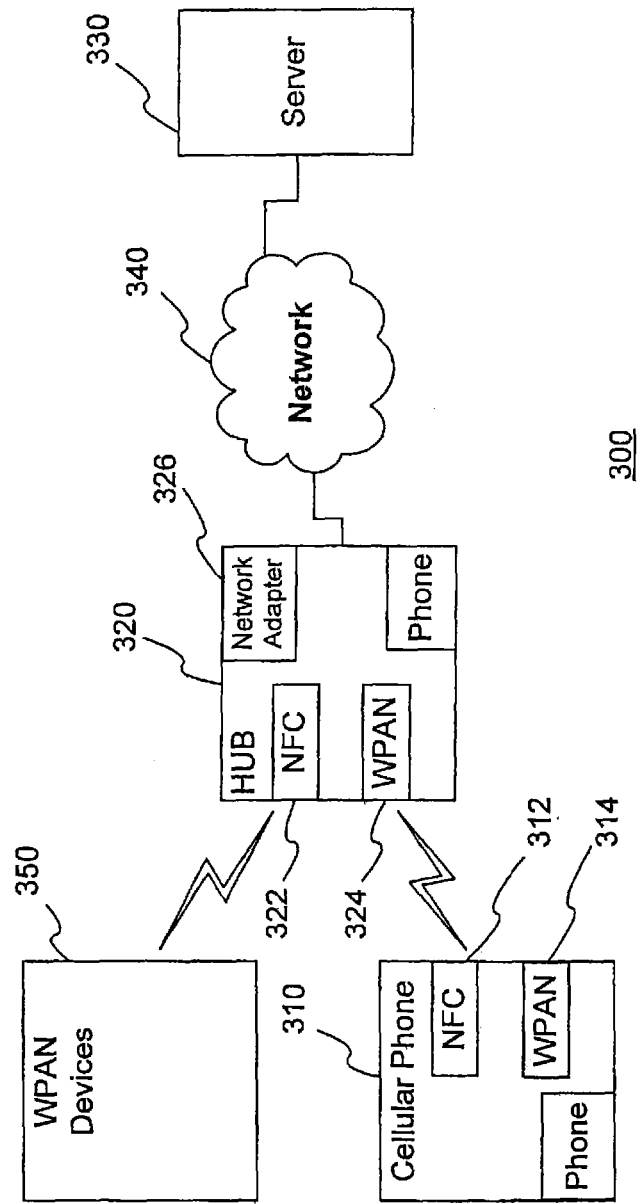
FIG. 3 is a block diagram illustrating a system for facilitating secure receipt and satisfaction of an action request such as a bill payment in accordance with the present invention.

FIG. 3 illustrates an example of a system 300 that implements this aspect of the present invention. The system 300 includes a user equipment (e.g., cellular phone, PDA, etc.) 310 and wireless HUB 320, which is connected to servers 330 through a network 340, such as the Internet.

The wireless HUB (WHUB) 320 may be located in a public or private location. For a public location, the WHUB 320 is preferably housed in a kiosk. The kiosk may be located on a street, or in an airport, shopping mall, or any location that is perceived as convenient and likely to include user traffic. For private locations, the WHUB 320 is preferably configured for usage in locations like homes or hotel rooms. In these environments, the WHUB 320 may be provided in a smaller device such as part of a Set Top Box (STB).

The handset 310 is equipped with a tag that provides a unique identifier that can be wirelessly communicated to the WHUB 320. A preferred tag is a Near Field Communication (NFC) tag 312. NFC provides short-range wireless connectivity that uses magnetic field induction to enable communication between the devices. It has a short range of a few centimeters, which is believed to be advantageous for applications of this aspect of the present invention. Although NFC is preferred, RFID or other substitutes may also be provided. The handset 310 also includes a WPAN transceiver 314, which allows additional communication channel between the handset and the WHUB 320.

The wireless WHUB 320 is similarly equipped with an NFC reader 322, a WPAN transceiver 324 and a network adaptor 326. The NFC technology accommodates secure and automatic authentication and data exchange between the NFC tag and NFC reader. According to this aspect of the present invention, the NFC is uniquely associated with other information that allows the appropriate action (payment, alert, etc.) to take place. For example, where the system is being used to accommodate mobile payment, the RFID tag is associated with the user's bank account. Further, once the device is authenticated through the unique identifier, a second secure communication channel with more capabilities is established between the handset 310 and WHUB 320. This allows the action request and related communications to be reliably transmitted between the two devices.

Accordingly, once the NFC based authentication is accomplished, a secure wireless connection between the handset 310 and WHUB 320 is established. This communication can implement the WPAN transceiver, which has a higher data rate and longer operational range compared to NFC. The secure communication allows the exchange of additional information related to the action, such as price and credit card information for a purchase request and corresponding payment scenario, to be sent between the handset 310 and the WHUB 320. The secure communication can be implemented by hardware (e.g., a dedicated hardware chipset) and software (e.g., data encryption algorithm).

The WHUB 320 can also exchange data with other WPAN devices 350. It may be useful for the WHUB 320 to communicate with these devices 340 to exchange information related to the action. For example, the WHUB 320 may collect water usage information from a water meter equipped with the WPAN device 340 functionality. This data may be stored locally by the WHUB 320, or may be transmitted to the appropriate server 330 through the network connection 350. The data does not necessarily need to be collected by the WHUB 320 concurrently with the user-requested action. For example, the acquisition and transmission of water usage information may occur periodically, and separate from the user's request to make a corresponding payment.

It is also noted that the WHUB 320 may optionally be configured with a wireless communication capability such as that provided in a cellular phone. The WHUB 320 is thus configurable to operate with a system that delivers locally applicable Internet content as described above in connection with FIGS. 1 and 2.

Figure 4:
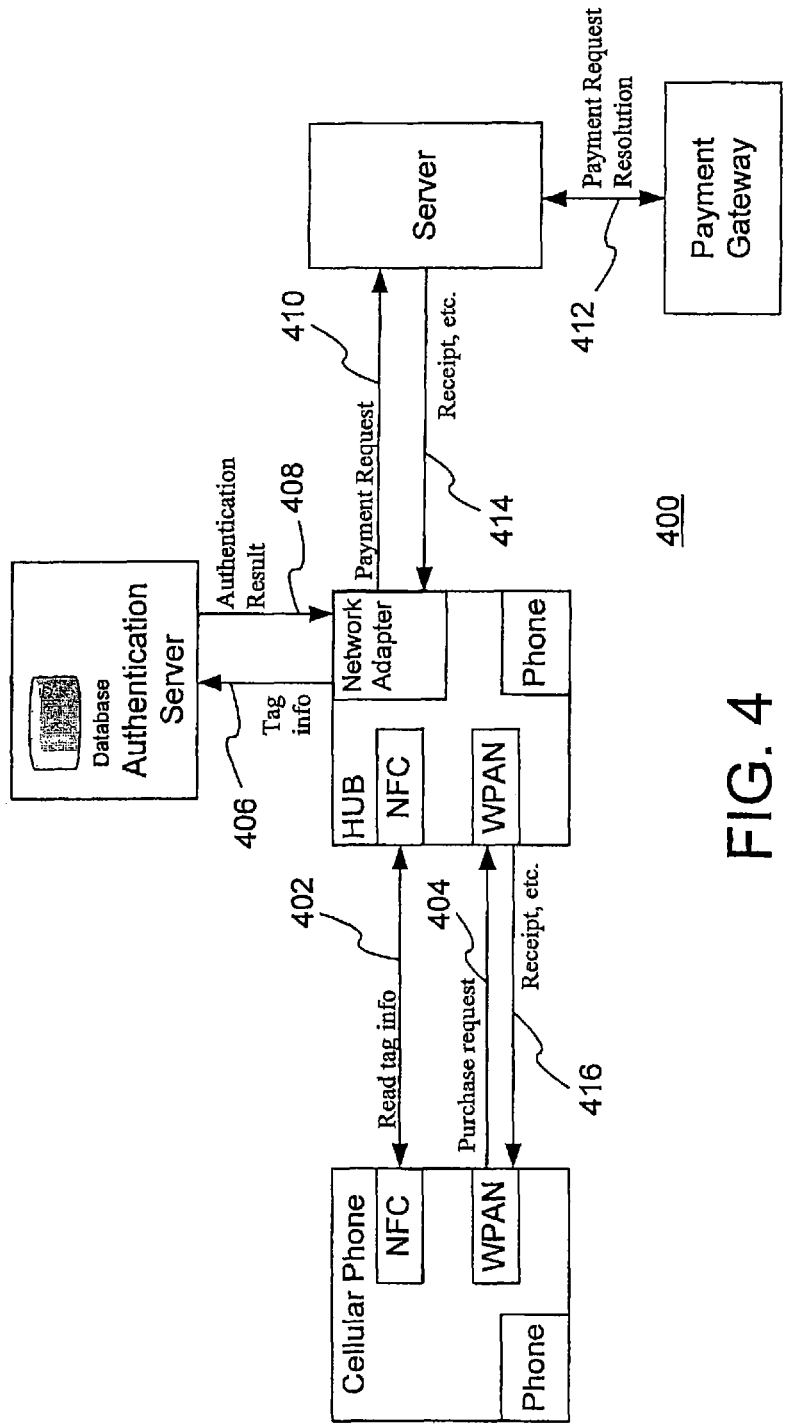
FIG. 4 is a block diagram illustrating an example of an action request process in accordance with the present invention.

FIG. 4 further illustrates and provides an example of a payment process 400 in accordance with this aspect of the present invention. The process 400 initiates with an authentication 402 process that accommodates recognition and identification of the handset by the wireless WHUB via the NFC tag.

The communication through the separate secure communication channel (e.g., WPAN) is then established. The WPAN functionality is used to communicate between the handset and the WHUB, so that content related to a requested action may be securely exchanged. In this example, the requested action is a purchase request 404.

It should be noted that the action may or may not immediately follow authentication 402. For example, the cellular phone may be configured to include browsing capability, which allows that interface of the cellular phone to be used to review items prior to making a purchase request.

Various purchase types may be made with the purchase request. Examples may include a physical item that is separately shipped to an address, a download that is made available immediately, possibly to the cellular phone, a service, etc.

Internet content may be accessed by the cellular phone in association with an action request. One example of providing content to the cellular phone may be the locally applicable Internet content as described above in connection with FIGS. 1-2. Also, the cellular phone may access Internet content through channels other than through the WHUB.

It is also noted that a purchase request is just one form of an action that may be carried out. Actions include but are not limited to bill payment, populating an account with funds, online shopping transactions, and others.

The process of authentication may be based upon a Tag ID and password. The Tag ID and password are sent 406 to the authentication server, which then returns a notification 408 confirming authentication. Preferably, this authentication indicates whether the individual is who he or she claims to be, but does not address the access rights of the individual. The authentication server may reside within or outside the WHUB.

As necessary, additional information may also be required in association with a requested action. For example, account identification information or passwords to access an online account may be required by an external server. In these circumstances, the external server sends a request to the WHUB for the information. The WHUB may store such information and respond to such a request. Alternatively, the WHUB may further exchange information with the user (through the handset), in order to obtain the additional information requested by the external server.

In connection with the purchase request 404, a payment request 410 is made between the WHUB and external server through the network connection. The payment request 410 allows the user to complete the transaction related to the purchase request 404. To accommodate a satisfactory completion of the payment request, the server corresponds with a payment gateway, and a resolution 412 indicating whether the payment request succeeds or fails follows.

Upon an indication of a successful payment request, the WHUB receives 414 a receipt or confirmation number from the external server relating to the requested action, and passes 416 that and/or related information to the handset confirming completion of the action. This may be a receipt, confirmation numbers, coupon codes, or the like.

According to still another aspect, the present invention provides for wireless management of tasks and corresponding alerts. One such task is diaper management, which is described in detail as follows.

This aspect of the present invention accommodates task management based upon wireless delivery of alerts to overcome the problem of estimating when the task requires completion. These alert based tasks include but are not limited to diaper management. For example, home security monitoring may also be accommodated.

Figure 5:
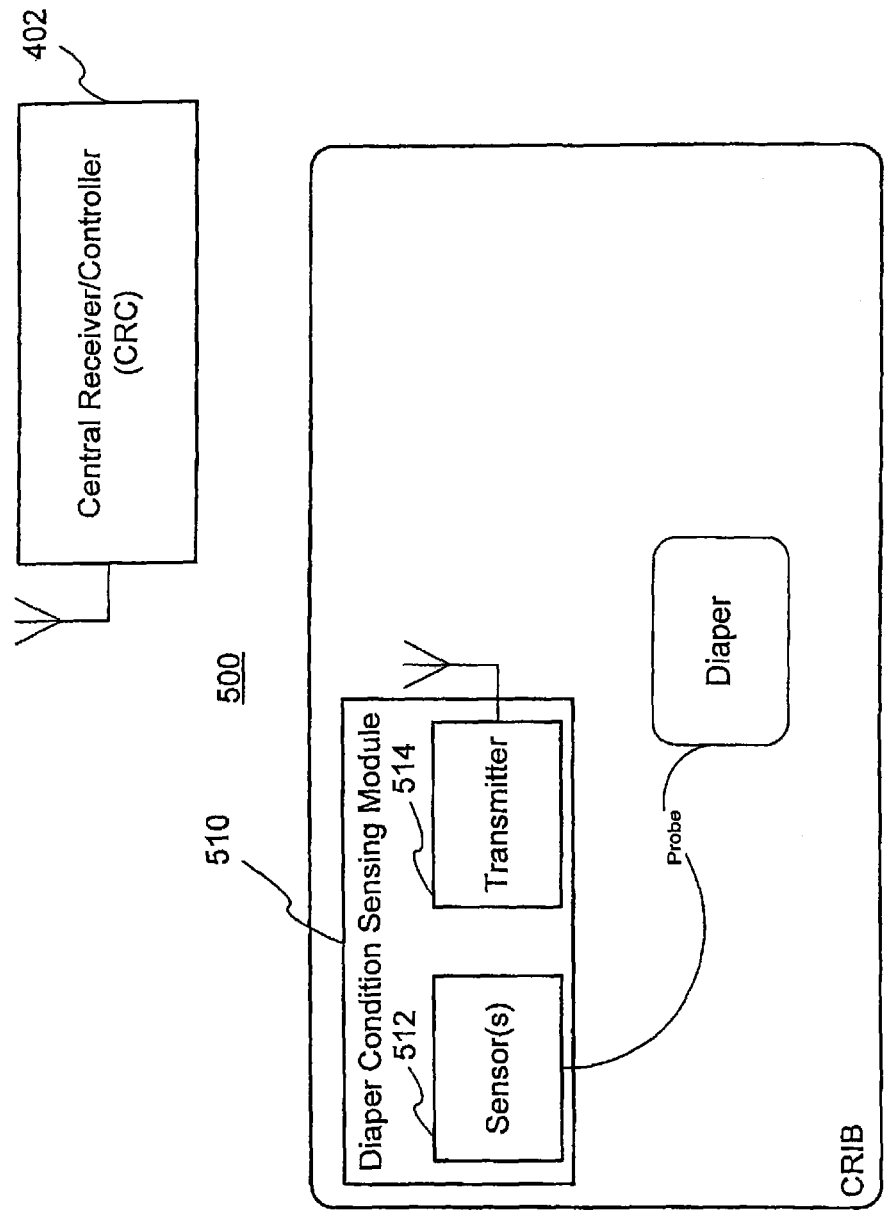
FIG. 5 is a block diagram illustrating a system for providing item status updates in accordance with the present invention.

FIG. 5 illustrates an example of a diaper management system 510 according to the present invention. The diaper management system 500 includes a diaper condition sensing module 510 and a central receiver/controller (CRC) 520. The CRC 520 operates on a conventional processing platform, and is configured to communicate wirelessly with the diaper condition sensing module 510. The CRC 520 also includes a network interface. The wireless and/or network interface accommodate the transmission of appropriate alerts to caregivers.

The diaper condition sensing module 510 includes a sensor 512 and a transmitter 514. The sensor 512 is configured to monitor one or more of the following conditions, whose results indicate whether the diaper is wet or not:

1. The weight of the diaper—urine or feces make the diaper heavier than a dry and clean diaper;
2. Electric conduction of urine;
3. Chemical properties of urine—volatilized air including volatile acid or ammonia, pH, starch enzymes, ketone bodies, and/or urobilinogen may all be detected and analyzed to determine the presence of urine;
4. Feces: the solid waste material; the bilirubin, or stercobilinogens in the feces; the specific food decomposed material including starch, fat, plant fiber, muscle fiber and so on; and/or
5. Any other elements, features, characteristics, and reflections of the unwanted on babies' diapers.

The sensor 512 triggers the transmitter 514 to establish a wireless communication channel between itself and the CRC 520. A signal is sent by the transmitter 514 to inform the CRC 520 that the diaper is wet. This wireless communication channel preferably uses wireless technologies such as UWB, Bluetooth, RFID, Spread Spectrum, or other conventional wireless communication technologies.

Each sensor 512 preferably has a unique ID. Multiple access mechanisms, such as TDMA, CDMA, FDMA, or other conventional approaches, may also be applied to allow the central receiver to communicate with multiple sensors at the same resource. It is believed that Zigbee/Bluetooth may be useful for many applications in light of the competing demands of working range, data rate and cost.

After the CRC 520 receives the signal, the receiver triggers sound, light, text and/or other indications of the status of the diaper. These indications may be variously displayed, broadcasted, reflected, etc. through speakers, telephones, pagers, beepers, computers, and so on to inform the caregiver(s) so that they can remedy the situation.

The diaper condition sensing module 510 may be variously provided. One example connects to the diaper using a probe that measures for desired criteria as described above and as shown in FIG. 5.

Another example provides the diaper condition sensing module 510 within the diaper. In this example, the sensor 512 also includes interfaces (probes) for measuring the desired criteria, within the confines of the diaper. The transmitter 514 may use various communication techniques as described above. For an RFID embodiment, the function may be provided by causing the circuit loop of the RFID tag to transition from open to close when the diaper condition (e.g., wet) is detected by the sensor, which automatically causes the ID Tag to be sensed by the tag reader of the CRC.

Still further, in this example the diaper condition sensing module 510 may be placed within a diaper and reused. Diapers may be configured with pouches or the like to allow the placement of the diaper condition sensing module 510. In another alternative, the diaper condition sensing module 510 is manufactured and sold as an integrated part of each diaper, so that caregivers do not have to be concerned about the placement of the module 510 each time a diaper is changed.

Figure 6:
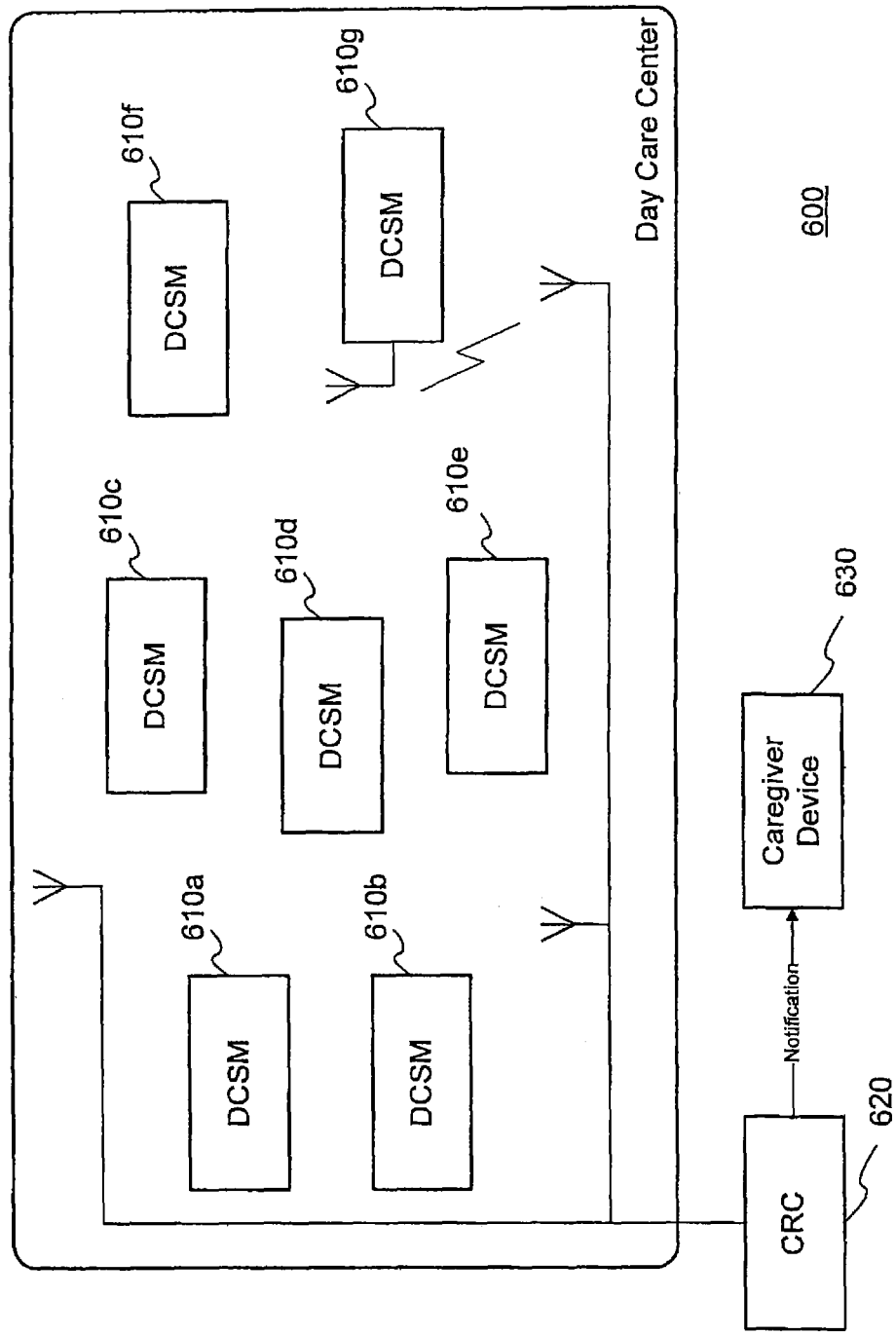
FIG. 6 is a block diagram illustrating a system for receiving and delivering a status update for multiple items in accordance with the present invention.

In addition to assisting a caregiver with regard to an individual child's diaper, a diaper management system may be configured to manage the diapers for groups of children, such as a pre-school class or a day care facility where many children may potentially wear diapers. An example of such a system 600 is shown in FIG. 6. The CRC 620 is configured to distinguish children in need of new diapers from those that are not and respectively sends messages to appropriate caregivers. To carry out this functionality, the CRC 620 is equipped with a database that associates the unique identifier corresponding to each diaper condition sensing module 610a-g to at least one contact party. Alternative communication pathways (phone, e-mail, etc.), multiple contacts (caregiver#1, caregiver#2), and various other information may be associated to a given diaper condition sensing module 610a-i in the database.

In addition to providing a status alert about the condition of the diaper, the CRC 620 also determines the location of the diaper by using wireless location techniques, including but not limited to Angle of Arrival, Time of Arrival, and Received Signal Strength Indication. This allows the option of also giving the designated caregiver information about the location of the child having the soiled diaper.

Figure 7:
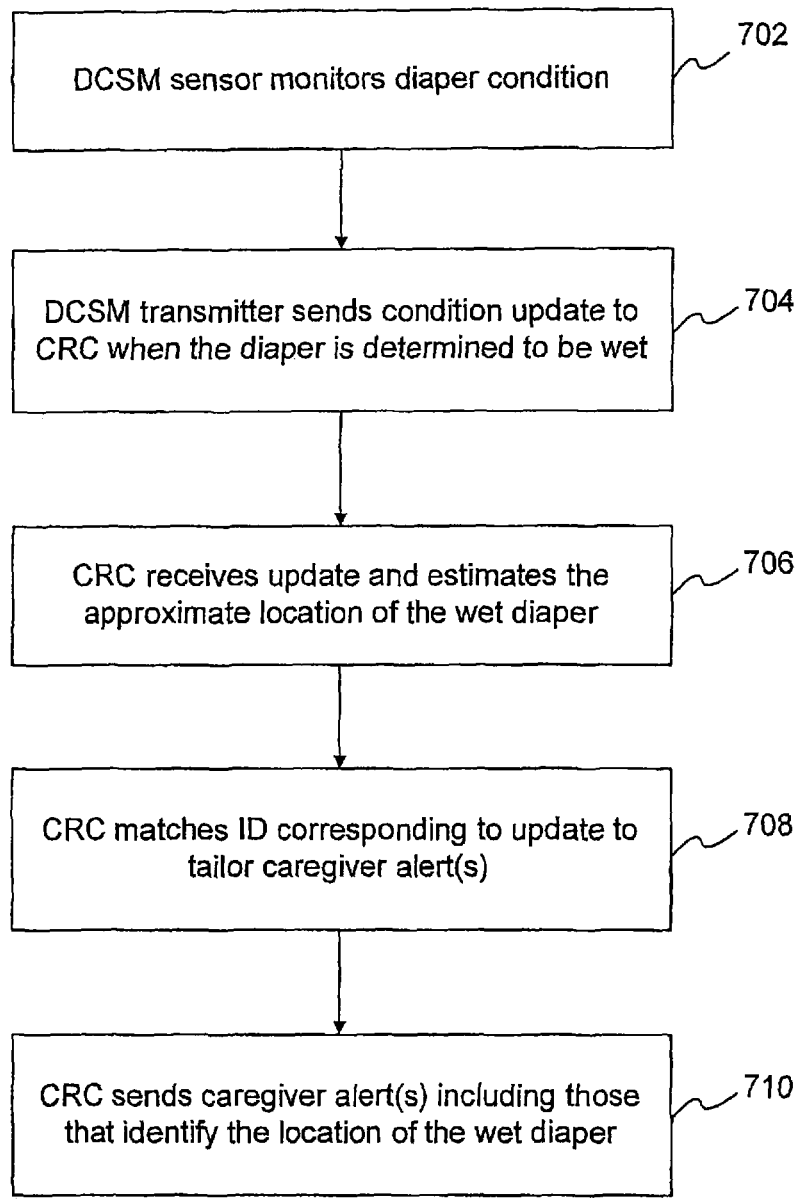
FIG. 7 is a flow diagram illustrating a process for providing a diaper condition update in accordance with the present invention.

FIG. 7 is a flow diagram illustrating a process 700 for sending a caregiver alert according to a diaper condition in accordance with the present invention. The process 700 commences with the DCSM sensor monitoring 702 the diaper condition. When the diaper condition changes, such as when it is wet, the DCSM sensor detects the updated condition of the diaper. When this occurs, the DCSM transmitter sends 704 the diaper condition update to the CRC. The CRC receives 706 the update and corresponding indications. Many conditions may be updated and the DCSM and CRC are configured to communicate them accordingly. The CRC, once provided with the update, proceeds to estimate the location of the (e.g., wet) diaper. The DCSM sends an ID corresponding to the update, which identifies the diaper/child. The CRC queries its database and thus matches 708 the ID corresponding to the update to tailor caregiver alert(s). These alerts are then sent 710 to the caregiver(s) accordingly.

In the situation where there are multiple children/diapers being monitored, the CRC provided alert may be to a PC having a display screen with a map of the room(s) and the estimated location of the wet diaper. Other CRC provided alerts may merely notify additional caregiver(s) as to the status of the diaper, without the location, so that the additional caregiver(s) may be apprised of the status. The CRC may also poll the DCSM after a given period of time to ensure that the diaper condition has been updated. The CRC may be configured with configuration settings that allow a caregiver to specify when and how they should be updated. For example, if one caregiver is a baby sitter watching the child while the parents are out, the parent may configure the CRC not to send an alert to them when the diaper is first detected as being wet, but to wait until a certain period of time elapses. By contrast, the baby-sitter alert may be provided immediately. If the certain period of time passes and the diaper remains wet, the CRC can then notify the parent about the diaper condition, and the parent will realize that the diaper has not been changed.

Figure 8:
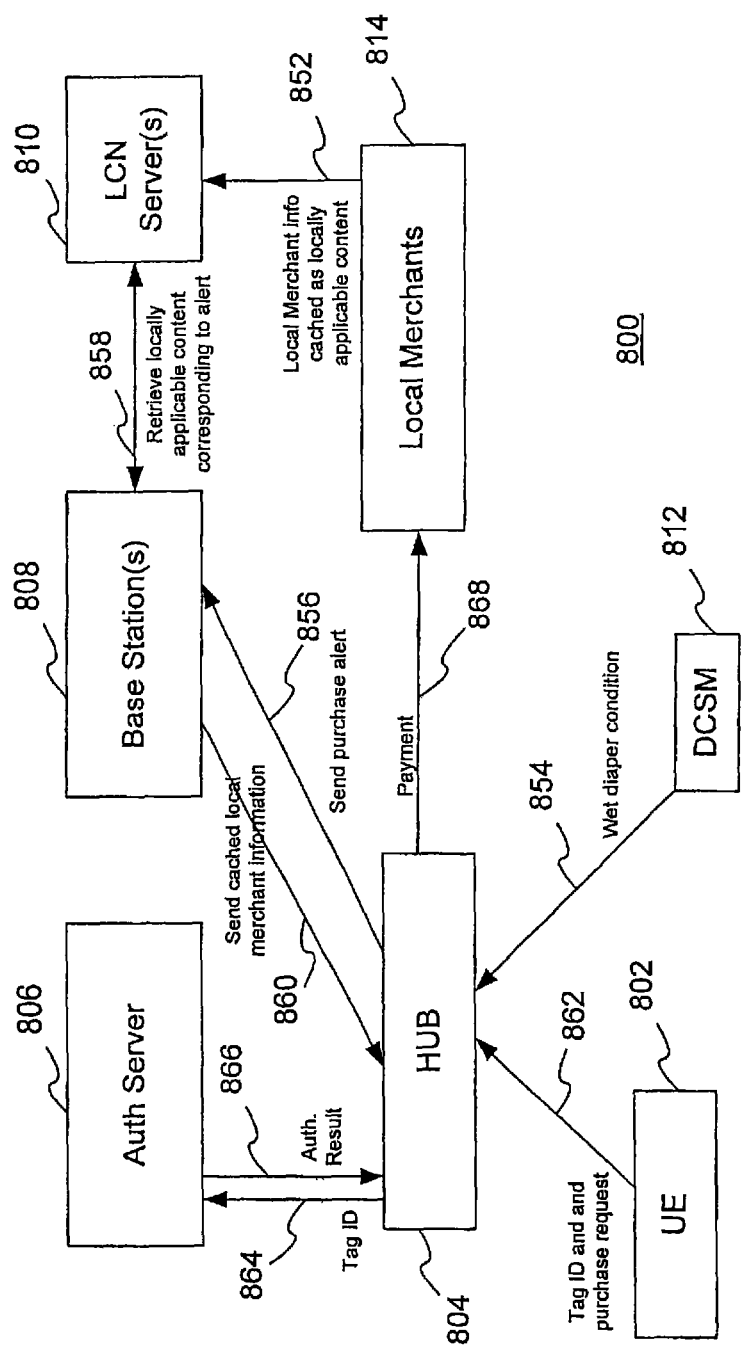
FIG. 8 is a block and event diagram illustrating the provision of locally applicable Internet content to a user in relation to a status update, and secure receipt and satisfaction of an action request related to the same, in accordance with the present invention.

FIG. 8 is a block and event diagram illustrating an example of a system 800 that implements several aspects of the invention described above. The system 800 includes UE 802, WHUB 804, Authorization Server 806, Base Station(s) 808, LCN Server(s) 810 and DCSM 812, which respectively provide the functionality described above for the components having the same names.

Local Merchant Server(s) 814 are also illustrated. As described in connection with the provision of locally applicable Internet content, merchants are apprised as to the local applicability of content, such as may be determined by frequency of access by users at a particular location corresponding to given base station(s). The WHUB 804, in addition to being configured to facilitate secure receipt and performance of an action such as a purchase request and corresponding payment request, includes the CRC functionality that allows a response to diaper condition update as provided by the DCSM 712 (the diaper being just one example of an item for which updates may be provided).

With the system 800 configured as such, the delivery of locally applicable Internet content may be provided in conjunction with the diaper update. Also, a local merchant (and corresponding server) 814 that sells diapers is able to present a coupon or other incentive to the user in conjunction with the determination that a diaper is wet by the DCSM 812. Moreover, in addition to having the capability of reminding the caregiver about this, the WHUB 804 may keep a database of household requirements and inventories. For example, the WHUB 804 may monitor the number of diapers detected as being used. When the amount of used diapers is close to the amount known to have been purchased previously, an additional alert may be presented to the user so that they are aware that they need diapers and they can get the discount if they buy brand x based upon the information provided by the local merchant.

The process for providing such functionality may be as follows. Based upon historical activity relating to access of locally applicable Internet content, as well as whatever merchant participation is desired in conjunction with the system 800, the local merchant's information is cached 852 at the relevant LCN Server(s). A wet diaper is detected 854 by the DCSM 812 and this information is transmitted to the WHUB 804. The WHUB 804, managing the diaper inventory for the household, determines that the inventory of diapers is low, and thus sends 856 a purchase alert through the Base Station 808 requesting information related to the current need. In response to this, the LCN Server(s) 810 determine that the local merchant information is relevant to the current need, and thus retrieve 858 and send 860 the cached local merchant information to the WHUB 804.

In conjunction with the above exchange of information, alerts of both the diaper condition and the low diaper inventory may be provided and retained for user review. When the user is ready to make a purchase, this may be accommodated via the WHUB 804. This purchase request may be made by directly interfacing with the WHUB 804, or by using the UE 802 in the fashion described above. The latter option is shown. There, the UE 802 sends 862 its Tag ID and purchase request to the WHUB 804. This, of course, may follow some browsing activity prior to the purchase request, so as to review the possible purchase options. The authentication may be as described above, based upon a Tag ID and password. The Tag ID and password are sent 864 to the authentication server, which returns a notification 868 confirming authentication.

Once the authorization is obtained, payment is sent 868 to the Local Merchant server 814 to complete the transaction, and the receipt, confirmation and other information may be fed back to the WHUB 804 regarding the same. For physical product like diapers, the WHUB will have provided (or the Local Merchant may already have) the shipping address. Additionally, if the Local Merchant is a provider of several items (such as a supermarket), then items may be accumulated prior to completing a purchase and/or making a shipment and/or making the products available for pick up by the user. The WHUB is preferably configured with a shopping list that allows organization of periodic cumulative purchases to accommodate this functionality.

Thus embodiments of the present invention produce and provide improved delivery of Internet content to CN users, facilities for accommodating task management through a portable terminal device, and for providing alerts. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for optimizing delivery of content to users, the method comprising:
   receiving requests for Internet content from user devices;
   monitoring the requests for the Internet content;
   storing particular Internet content that is determined to be locally applicable based upon the monitoring of the requests;
   wherein the particular Internet content is stored at a content server that is logically proximate to a particular location associated with the user devices;
   wherein the storing includes refreshing the particular Internet content based on an updated monitoring to provide a refreshed particular Internet content;
   wherein the refreshing the particular Internet content includes adding new Internet content based on the updated monitoring; and
   sending the refreshed particular Internet content to a requesting user device,
   wherein the content server is determined as being logically proximate to the particular location based on at least a base station associated with the user devices, the user devices being wireless terminals;
   wherein the refreshed particular Internet content comprises commercial incentive information; wherein the commercial incentive information includes information of a coupon or an advertisement; and wherein the commercial incentive information is sent to the user devices based at least in part on a relevance of the commercial incentive information with the requests for the Internet content.

2. The method of claim 1, wherein the content server is determined as being logically proximate to the particular location based on at least one of the following:
   a bandwidth resource for transmitting the refreshed particular Internet content to the requesting user device;
   locations of respective ones of the user devices;
   a location of the base station through which the refreshed particular Internet content is sent;
   a location of the base station associated with the user devices;
   a dedicated resource for transmitting the refreshed particular Internet content;
   a location of the base station through which the requests for the Internet content are transmitted;
   comparing the particular location with a location identified with the Internet content requested.

3. The method of claim 2, wherein the monitoring of the Internet content comprises at least one of the following:
   monitoring frequency of the requests for the Internet content;
   monitoring a count of the requests for the Internet content.

4. The method of claim 3, wherein the monitoring of the Internet content comprises at least the following:
   comparing the particular location with a location identified with the Internet content requested.

5. The method of claim 3 further comprises an output interface configured to notify a commercial entity based upon a relevance of the requests for the Internet content to the commercial entity.

6. A system for optimizing delivery of content to users, the system comprising:
   at least one input interface configured to receive requests for Internet content from user devices;
   at least one content server configured to perform monitoring of the requests for the Internet content and storing particular Internet content that is determined to be locally applicable based upon the monitoring of the requests, the content server being logically proximate to a particular location associated with the user devices;
   wherein the storing includes refreshing the particular Internet content based on an updated monitoring to provide a refreshed particular Internet content;
   wherein the refreshing the particular Internet content includes adding new Internet content based on the updated monitoring; and
   at least one output interface configured to send the refreshed particular Internet content to a requesting user device,
   wherein the content server is determined as being logically proximate to the particular location based on at least
   a base station associated with the user devices, the user devices being wireless terminals;
   wherein the refreshed particular Internet content comprises commercial incentive information; wherein the commercial incentive information includes information of a coupon or an advertisement; and wherein the commercial incentive information is sent to the user devices based at least in part on a relevance of the commercial incentive information with the requests for the Internet content.

7. The system of claim 6, wherein the content server is determined as being logically proximate to the particular location based on at least one of the following:
   a bandwidth resource for transmitting the refreshed particular Internet content;
   locations of respective ones of the user devices;
   a location of the base station through which the refreshed particular Internet content is sent;
   a location of the base station associated with the user devices;
   a dedicated resource for transmitting the refreshed particular Internet content;
   a location of the base station through which the multiple requests are transmitted;
   comparing the particular location with a location identified with the Internet content requested.

8. The system of claim 7, wherein the monitoring of the Internet content comprises at least one of the following:
   monitoring frequency of the requests;
   monitoring a count of the requests.

9. The system of claim 8, wherein the monitoring of the Internet content comprises at least the following:
   comparing the particular location with a location identified with the Internet content requested.

10. The system of claim 8, wherein the content server is determined as being logically proximate based on at least the following:
    the location of the base station through which the refreshed particular Internet content is sent.

11. The system of claim 8, wherein the content server is determined as being logically proximate based on at least the following:
the locations of the respective ones of the user devices.

12. The system of claim 8 further comprises at least one output interface configured to notify a commercial entity based upon a relevance of the requests for the Internet content to the commercial entity.

13. The system of claim 8, wherein the refreshing is based on at least one of the following:
full associative (FA),
direct mapped (DM),
set associative (SA).

14. The system of claim 8, wherein the refreshing is based on at least one of the following replacement schemes:
Random,
Least recently used (LRU),
First in first out (FIFO).

15. The system of 8, wherein the respective locations of the user devices are determined with at least one of:
cellular/GPS location information;
IP address information;
Time Difference of Arrival (TDOA);
Direction Difference of Arrival (DDOA);
ZIP code;
Received Signal Strength Indication (RSSI);
profile information provided by users.

16. The system of claim 8 further comprising:
at least one server configured to store information pertaining to a financial account associated with a user device and send the information through a communication channel to facilitate a transaction requested by the user device; wherein the transaction is relevant with the refreshed particular Internet content that is sent to the user device; wherein the transaction is based on recognition of a unique identifier associated with the user device; and wherein information of the unique identifier corresponding to the user device is transmitted through a connection that is separate from the communication channel.

17. The system of claim 16, wherein the transmission of information of the unique identifier is through a short range wireless connection; and wherein the user device is a cellular phone.

18. The system of claim 17, wherein the information pertaining to the financial account is regarding a credit card account, and wherein the refreshed particular Internet content is merchant related information.

19. The system of claim 17, wherein a password or a pin number is associated with the unique identifier corresponding to the user device to identify a user of the user device.

20. The system of claim 17, wherein the short range wireless connection is an electromagnetic transmission connection.

21. The system of claim 17, wherein the unique identifier is associated with the financial account.

22. The system of claim 8 further comprises at least one input interface configured for receiving, through a wireless transmission channel, an item status signal regarding an updated condition of merchandise; wherein the item status signal is sent in response to an indication of the updated condition; and wherein the refreshed particular Internet content is sent based on the updated condition.

23. The system of claim 22, wherein the updated condition is detected by a wireless sensor.

24. The system of claim 8 further comprises at least one input interface configured for receiving, through a wireless transmission channel, an item status signal regarding an updated condition of merchandise; wherein the wireless transmission channel is established for transmission of the item status signal; the wireless transmission channel being established in a local wireless communication network in response to an indication of the updated condition; and wherein the refreshed particular Internet content is sent based on the updated condition.

25. The system of claim 24, wherein the updated condition is detected by a wireless sensor.

26. The system of claim 8, wherein the particular Internet content is determined to be locally applicable by iteratively determining local applicability based on said monitoring on a layered basis, such that a first layer of local applicability corresponds to the Internet content requested by the user devices in a first geographical area in which a location the user devices reside, and at least one succeeding layer of local applicability corresponds to Internet content requested by user devices in at least one succeeding geographical area that encompasses and is larger than the first geographical area.

27. The system of claim 8 further comprises at least one output interface configured to notify a commercial entity based upon relevance of the requests for the Internet content to the commercial entity.

28. A wireless device configured to facilitate electronic communication of information, the wireless device comprising:
a processor;
a wireless radio chip containing information of a unique identifier corresponding to the wireless device;
a memory configured to store program code that includes instructions executable by said processor, said instructions comprising:
instructions for transmitting, through a wireless transmission channel, an item status signal to provide information regarding an updated condition of a merchandise, wherein the wireless transmission channel is established in a local wireless communication network in response to an indication of the updated condition and the wireless transmission channel is established for transmission of the item status signal by the wireless device; and
wherein the unique identifier corresponding to the wireless device is recognized during a processing of a purchase request for the merchandise regarding the updated condition based on a successful transmission of the item status signal;
wherein the purchase request for the merchandise is identified based on recognition of the unique identifier;
wherein information of a user account is communicated through a communication channel to accommodate the processing of the purchase request; wherein the user account is associated with the wireless device; and wherein the wireless transmission channel is separate from the communication channel, the information of the user account comprising the information for the processing the purchase request; and
wherein the wireless device is designated to transmit the item status signal.

29. The wireless device of claim 28, wherein the instructions further comprising:
instructions for communicating with a portable user terminal device, through a Blue-tooth connection, information about the transmission of the item status signal.

30. The wireless device of claim 29, wherein the information about the transmission comprises a time or a method for the transmitting the item status signal.

31. The wireless device of claim 28, wherein a location for the merchandise is determined based on information of the wireless transmission channel established in the local wireless communication network for the transmission of the item status signal.

32. The wireless device 28, wherein recognition of the unique identifier is made with information of wireless transmission channel for the transmission of the item status signal established in the local wireless communication network.

33. The wireless device of claim 28, said instructions further comprising:
instructions for confirming the successful transmission of the item status signal.

34. The wireless device of claim 28, wherein the wireless device comprises a wireless sensor; and wherein the item condition update is detected by the wireless sensor.

35. A system for facilitating electronic communication of secure information, the system comprising:
at least one database configured to store information of a user account associated with a wireless signal transmitter,
wherein the wireless signal transmitter is designated to transmit an item status signal to provide information regarding an updated condition of a merchandise;
wherein the item status signal is transmitted through a wireless communication channel from the wireless signal transmitter; the wireless communication channel being established in a local wireless communication network in response to an indication of the updated condition, the wireless communication channel being established for transmission of the item status signal from the wireless signal transmitter;
wherein the system is configured to recognize a unique identifier corresponding to the wireless signal transmitter based on a successful transmission of the item status signal;
wherein the system is further configured to identify a purchase request for the merchandise based on recognition of the unique identifier corresponding to the wireless signal transmitter;
wherein the information of the user account comprises information for a processing of the purchase request; and
at least one output interface configured to communicate the information for the processing of the purchase request through a communication channel to accommodate a completion of the processing of the purchase request, the communication channel being separate from the wireless communication channel established for the transmission of the item status signal; and
wherein the system is configured to update the user account with confirmation information regarding the processing of the purchase request.

36. The system of claim 35, wherein the system is further configured to determine a location for the merchandise based on information of the wireless communication channel established in the local wireless communication network for the transmission of the item status signal.

37. The system of claim 35 further comprising a wireless sensor configured to detect the updated condition of the merchandise.

38. The system of claim 35, wherein the information for the processing of the purchase request comprises a purchase requirement, a shipping address, and payment information.

39. The system of claim 38, wherein the recognition of the unique identifier is made in connection with the information for the processing of the purchase requirement.

40. The system of claim 38 is configured to provide the user account with promotion information related with the purchase request.

41. The system of claim 40, wherein the system is configured to receive, from a portable user terminal device, configuration setting information regarding the transmission of the item status signal; and wherein the configuration setting information includes a time or a method for the transmission of the item status signal.

42. The system of claim 35, wherein the system is configured to recognize the unique identifier corresponding to the wireless signal transmitter based on information of the wireless communication channel established in the local wireless communication network for the transmission of the item status signal.

43. The system of claim 42, wherein the system is configured to recognize the unique identifier in connection with the information for the processing of the purchase request.

44. The system of claim 42 further comprising a wireless sensor configured to detect the updated condition of the merchandise.

45. The system of claim 44, wherein the wireless sensor is configured to automatically detect the updated condition of the merchandise.

46. The system of claim 42, wherein the information for the processing of the purchase request comprises a purchase requirement, a shipping address, and payment information; and wherein the system is configured to provide the user account with promotion information related with the purchase request.

47. The system of claim 46, wherein the system is configured to receive, from a portable user terminal device, the information for the processing of the purchase request.

48. The system of claim 47, wherein the system is configured to send to the portable user terminal device information regarding the updated condition of the merchandise.

49. The system of claim 46, wherein the wireless signal transmitter is configured to communicate information related with the processing of the purchase request with a portable user terminal device through a Blue-tooth connection.

50. The system of claim 35, wherein the system is configured to confirm the successful transmission of the item status signal.

51. The system of claim 35, wherein the system is configured to receive, from a user terminal, configuration setting information related with the processing of the information regarding the updated condition; and wherein the configuration setting information includes a time or a method for the transmission of the item status signal.

52. A method for facilitating electronic communication of secure information, the method comprising:
storing information of a user account associated with a wireless signal transmitter,
wherein the wireless signal transmitter is designated to transmit an item status signal to provide information regarding an updated condition of a merchandise;
wherein the item status signal is transmitted through a wireless communication channel from the wireless signal transmitter, the wireless communication channel being established in a local wireless communication network in response to an indication of the updated condition, the wireless communication channel being established for transmission of the item status signal from the wireless signal transmitter;

recognizing a unique identifier corresponding to the wireless signal transmitter based on a successful transmission of the item status signal;

identifying a purchase request for the merchandise based on recognition of the unique identifier corresponding to the wireless signal transmitter;

communicating information for a processing of the purchase request through a communication channel to accommodate a completion of the processing of the purchase request, the communication channel being separate from the wireless communication channel established for the transmission of the item status signal; and updating the user account with confirmation information regarding the processing of the purchase request, wherein the information of the user account comprises the information for the processing of the purchase request.

53. The method of claim 52, wherein the method further comprising:

determining a location for the merchandise based on information of the wireless communication channel established in the local wireless communication network for the transmission of the item status signal.

54. The method of claim 52 further comprising:

receiving, from a portable user terminal device, configuration setting information regarding the transmission of the item status signal, wherein the configuration setting information includes a time or a method for the transmission of the item status signal based on the updated condition.

55. The method of claim 54 further comprising:

communicating information related with the processing of the purchase request with the portable user terminal device, through a Blue-tooth connection, by the wireless signal transmitter.

56. The method of claim 52, wherein the recognizing the unique identifier corresponding to the wireless signal transmitter is based on information of the wireless communication channel established in the local wireless communication network for the transmission of the item status signal.

57. The method of claim 56 further comprising:

providing the user account with promotion information based on the purchase request; and wherein the information for the processing of the purchase request comprises a purchase requirement, a shipping address, and payment information.

58. The method of claim 57, wherein the method further comprising:

receiving, from a portable user terminal device, the information for the processing of the purchase request.

59. The method of claim 57 further comprising:

receiving, from a portable user terminal device, configuration setting information regarding the transmission of the item status signal; and wherein the configuration setting information includes a time or a method for the transmission of the item status signal based on the updated condition.

60. The method of claim 52 further comprising:

detecting the updated condition of the merchandise by a wireless sensor.

* * * * *